(12) United States Patent
Lang et al.

(10) Patent No.: US 9,469,944 B2
(45) Date of Patent: Oct. 18, 2016

(54) METHOD AND COMPOSITION FOR REINFORCING ASPHALT CEMENT CONCRETE

(71) Applicants: Tracy H. Lang, Mercer, PA (US); Joseph A. Sturtevant, Vancouver, WA (US)

(72) Inventors: Tracy H. Lang, Mercer, PA (US); Joseph A. Sturtevant, Vancouver, WA (US)

(73) Assignee: Surface-Tech LLC, Portland, OR (US)

( * ) Notice: Subject to any disclaimer, the term of this patent is extended or adjusted under 35 U.S.C. 154(b) by 64 days.

(21) Appl. No.: 14/031,002

(22) Filed: Sep. 18, 2013

(65) Prior Publication Data
US 2015/0078823 A1   Mar. 19, 2015

(51) Int. Cl.
| | | |
|---|---|---|
| E01C 7/00 | (2006.01) | |
| E01C 11/16 | (2006.01) | |
| C04B 16/12 | (2006.01) | |
| D02G 3/02 | (2006.01) | |
| E01C 7/18 | (2006.01) | |
| C04B 26/26 | (2006.01) | |
| C04B 16/06 | (2006.01) | |
| C08L 95/00 | (2006.01) | |
| C04B 111/00 | (2006.01) | |

(52) U.S. Cl.
CPC ......... *E01C 11/165* (2013.01); *C04B 16/0691* (2013.01); *C04B 16/12* (2013.01); *C04B 26/26* (2013.01); *C08L 95/00* (2013.01); *D02G 3/02* (2013.01); *E01C 7/18* (2013.01); *C04B 2111/0075* (2013.01); *C08L 2555/52* (2013.01); *C08L 2555/86* (2013.01)

(58) Field of Classification Search
CPC ....... E01C 7/18; E01C 11/165; C04B 16/12; C04B 16/0691; C04B 26/26; C04B 2111/0075; D02G 3/02; D02G 2111/0075; C08L 95/00
USPC .................. 404/17, 28, 31, 45, 75, 82, 100, 404/101–111, 118
See application file for complete search history.

(56) References Cited

U.S. PATENT DOCUMENTS

| | | | | |
|---|---|---|---|---|
| 4,066,723 | A * | 1/1978 | King et al. | 264/34 |
| 4,957,390 | A * | 9/1990 | Shoesmith | 404/70 |
| 5,028,266 | A * | 7/1991 | Rettenmaier | C08K 7/02 106/282 |
| 5,174,228 | A * | 12/1992 | Grimnes | 112/475.01 |
| 5,407,139 | A * | 4/1995 | Mleczewski | E01C 19/104 222/227 |
| 5,683,208 | A * | 11/1997 | Fage et al. | 405/263 |
| 5,869,413 | A * | 2/1999 | Gallagher et al. | 442/381 |
| 6,488,755 | B1 * | 12/2002 | Seyler et al. | 106/282 |
| 7,427,174 | B2 * | 9/2008 | Dearing | E01C 19/407 404/118 |
| 2005/0009428 | A1 * | 1/2005 | Porter et al. | 442/129 |
| 2007/0253773 | A1 * | 11/2007 | Huang et al. | 404/35 |
| 2008/0207833 | A1 * | 8/2008 | Bear | C08G 63/6884 525/190 |
| 2011/0305820 | A1 * | 12/2011 | Kadrmas | C08J 5/04 427/8 |
| 2016/0108168 | A1 * | 4/2016 | Harasin | B29C 70/521 428/423.1 |

* cited by examiner

*Primary Examiner* — Raymond W Addie
(74) *Attorney, Agent, or Firm* — Mersenne Law

(57) ABSTRACT

Reinforcing fibers, such as aromatic polyamide ("aramid") fibers, are treated by coating with or embedding in a binder such as a Fischer-Tropsch wax. The treated fibers are divided into suitably-sized units, which are added to bitumen, aggregate and other ingredients in an asphalt cement concrete mix. The units shed fibers into the mix during the manufacturing process so that the fibers are distributed fairly evenly throughout the asphalt mixture. The binder may also impart beneficial qualities to the finished asphalt concrete.

14 Claims, 2 Drawing Sheets

METHOD AND COMPOSITION FOR REINFORCING ASPHALT CEMENT CONCRETE

CONTINUITY AND CLAIM OF PRIORITY

This is an original U.S. patent application.

FIELD

The invention relates generally to a reinforcement composition and method of reinforcing asphalt and asphalt-concrete composite pavement. More specifically, the invention relates to methods of preparing reinforcing fibers and of using such fibers in the mixing of asphalt concrete pavement.

BACKGROUND

Asphalt Cement Concrete ("ACC," or often just "asphalt") is widely used as a paving material to surface roads, runways and parking lots. By some estimates, up to 90% of all such surfaces are made with ACC. A basic asphalt concrete comprises asphalt (also known as bitumen), a highly-viscous or semi-solid form of petroleum; and aggregates such as stone, sand or gravel, in about a 1:19 ratio (5% asphalt, 95% aggregate). The ingredients are heated, mixed, spread on the surface to be paved (often an earthen, stone or crushed-rock bed) and compacted to form ACC.

A variety of trace ingredients can be added to asphalt cement concrete to improve its strength, durability, performance or construction characteristics. In addition, careful control of aggregate size, shape and composition can significantly improve ACC characteristics. Because of the enormous amount of ACC used around the world, even modest improvements in performance or handling can yield significant benefits.

In the context of a related paving material, Portland Cement Concrete, it is known that the introduction of various types of fibers to the basic Portland cement and aggregate mixture can improve strength and toughness of the resulting concrete. Similar fibers have been used with asphalt concrete to good effect, but differences between Portland cement concrete and asphalt cement concrete's manufacturing and handling requirements make it more difficult to introduce fibers into asphalt concrete. (For example, the elevated temperatures and vigorous mixing required by ACC damages, melts or destroys many fibers that work well with Portland cement concrete, and it is challenging to prevent small, lightweight fibers from blowing away or clumping before they are captured and secured into the asphalt/aggregate mixture.)

One workable method of introducing reinforcing fibers into asphalt concrete is described in U.S. Pat. No. 8,114,514 to MacDonald and Lang. The method is to construct a core containing the fibers, surrounded by an outer container of a polyolefin. This container is introduced into the asphalt concrete during mixing. The elevated temperatures during mixing cause the outer container to melt or disperse, releasing the reinforcing fibers into the AC where further mixing distributes them.

Alternative methods of introducing reinforcing fibers into asphalt concrete may provide greater control over the quantity and distribution of the fibers in the finished pavement, leading to improved pavement characteristics and reduced construction cost.

SUMMARY

Embodiments of the invention pre-treat a reinforcing fiber with a binder agent before introducing segments of the treated fiber into an asphalt concrete mixture. The binder controls the fiber segments which allows for distribution in a host of different production feeding equipment while assuring the fibers are conveyed into the asphalt mixing chamber without separating, clumping, or being carried away by heat and convection turbulence before they are captured into the ACC mix. Once captured, the binder melts or dissolves and releases the fibers.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention address three interrelated issues in the mixing of improved asphalt concrete pavement. First, improved dispersion of strong, friable fibers throughout the bitumen/aggregate mixture provides better uniformity and characteristics control of the finished pavement. Second, the fibers can serve as a carrier and dispersant for ingredients that provide other benefits to asphalt performance. And third, the form factor and fiber treatment improves material handling and closing during asphalt mixing.

Figure 1:
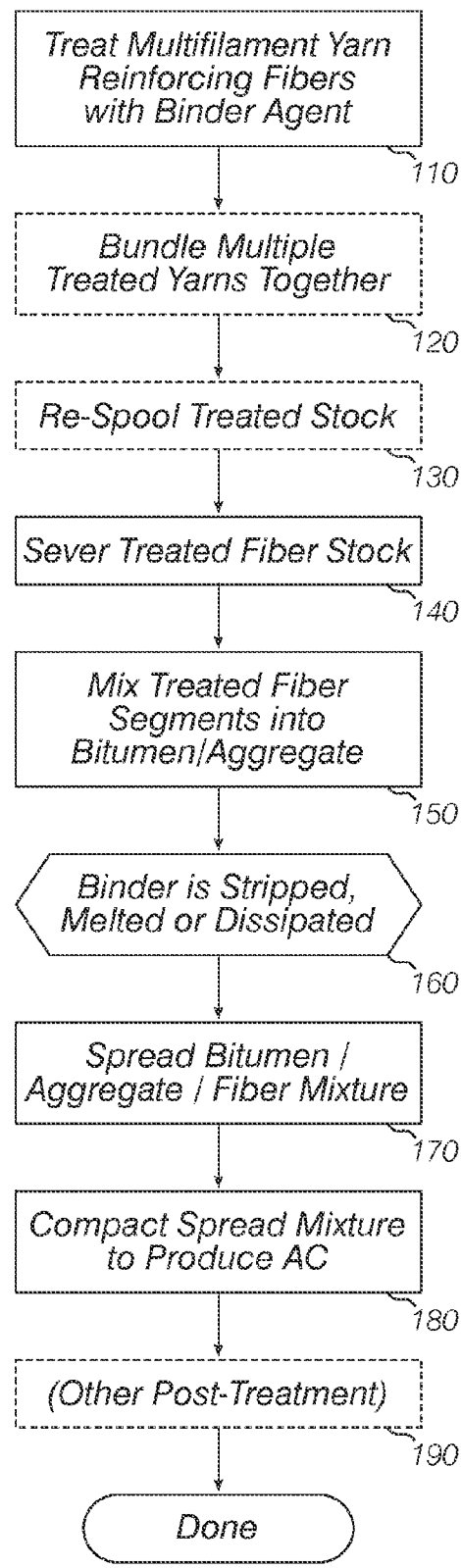
FIG. 1 is a flow chart outlining a method for making and using a fiber asphalt-concrete reinforcing material.
Figure 2:
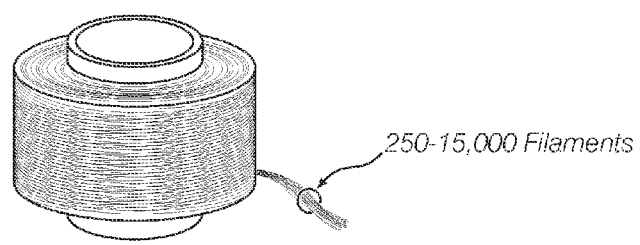
FIG. 2 shows a spool of reinforcing-fiber yarn.

FIG. 1 outlines a method of manufacturing and installing asphalt concrete according to an embodiment of the invention. This method uses reinforcing fibers supplied in yarn form (e.g., FIG. 2). The individual reinforcing fibers are very thin—on the order of 5-15 microns in diameter—and are organized into roughly parallel bundles containing 250-15,000 filaments. The yarn is typically untwisted.

Figure 3:
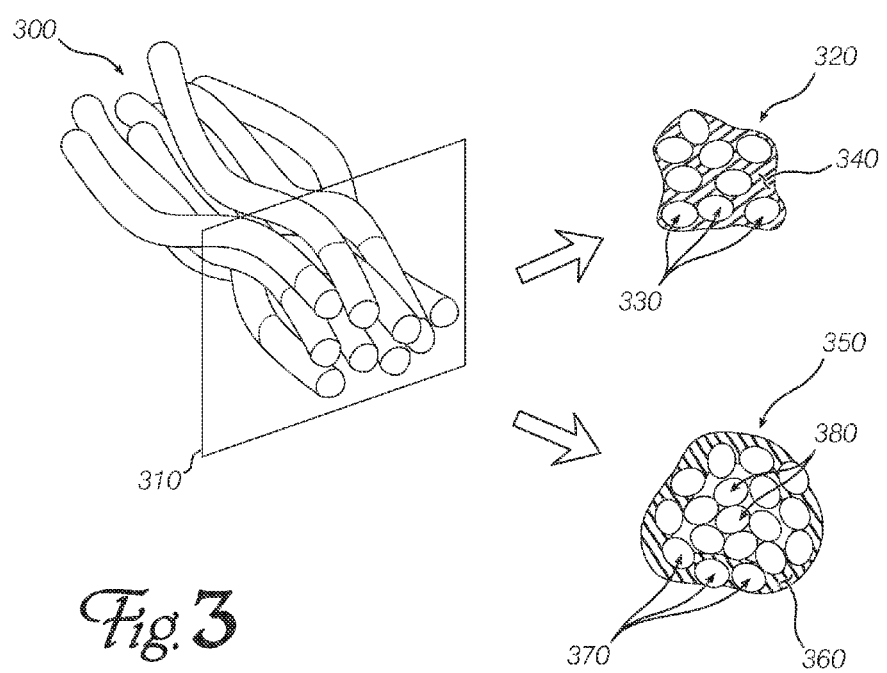
FIG. 3 shows sample cross-sections of the treated reinforcing fiber yarn.

First, a length of multifilament reinforcing fiber yarn is treated with a binder agent (110). For example, the bare untwisted fiber yarn may be clipped into a melted binder, passed across a solid binder material to accumulate a sheath, shell, coating or layer of binder on the outer surface of the yarn, or otherwise treated so that the yarn is coated, sheathed, sized or embedded into the binder. The treatment results in a structure like that shown in FIG. 3: the bundle of fibers 300 (only a few of which are shown here), has a cross section (310) like that shown at 320, where the fibers 330 are mostly embedded in the binder 340; or like that shown at 350, where the binder 360 mostly coats and embeds the outer fibers 370, while the interior fibers 380 are simply enclosed within the binder and outer-fiber shell.

In some embodiments, a plurality of treated yarn segments may be joined together by bundling, coating and/or soaking in the same or a different binder to produce a treated reinforcing fiber "rope" with physical structure similar to a multi-strand wire rope (120). The tensile-strength characteristics of such a rope are not especially important to embodiments of the invention, so it is not critical that the individual fiber bundles be of a particular size, shape, twist or other configuration.

The treated (coated, sheathed, sized or embedded) fiber stock may be respooled for storage or transport (130).

Next, at a convenient time prior to the introduction of the treated fiber into an asphalt-aggregate mixture, the treated fiber is severed into segments of suitable length (140). Good results have been obtained with segments of about 20 mm, but segments between about 8 mm and about 100 mm may be suitable for some combinations of bitumen/aggregate ratios, aggregate sizes, mixing and/or installing machinery, and other factors. As will be discussed below, longer segments are favored for embedment, crack resistance and spreading loads over larger areas of the finished pavement, while shorter segments are less likely to form clumps but provide limited reinforcement to the pavement. In general, segment length is a results-effective variable that can be tuned to adjust an embodiment to attain various material-handling and pavement characteristic goals.

In some AC manufacturing processes, bulk (uncut) treated reinforcing fiber yarn may be cut to a length controlled in a feedback loop by the characteristics of the asphalt concrete mix exiting the mixing process. This permits variations in bitumen quality, aggregate condition, temperature and other environmental conditions to be accommodated. Even when fixed segment lengths are used, the segments may be cut from a bulk spool of treated fiber at the point where the segments are introduced into the mix (rather than being supplied in pre-cut form).

The number of individual fibers in each segment depends on the number of individual fibers in the original yarn, and (optionally) the number of treated yarns combined together into a treated fiber rope. Each segment may have, for example, 250-15,000 fiber segments, or a number of fibers approximately equal to the sum of the fiber counts of the yarns comprising the rope.

The severed segments of treated fiber are introduced into the asphalt mix on a suitable volumetric basis (150). The amount of fiber (e.g., by weight, exclusive of the binder) is fairly small—on the order of tens to hundreds of grams (perhaps up to a few kilograms) per metric ton of ACC. Thus, it is preferred that the introduction means be able to meter the treated fiber segments accurately and without significant variation caused by misfeeding, material swarf, or other confounding factors. Further, reliable metering is important because an asphalt plant may produce hundreds or thousands of tons of material during a single shift. Reliable, unattended metering from a large bulk store reduces the labor cost of producing AC mix, and increases the consistency of the output. Pre-cut segments may be metered from a bulk bin or hopper by means of a screw-auger conveyor system, a vibratory feeder, a pneumatic or vacuum system. (Essentially, the pre-cut form factor is compatible with existing additive feed systems.)

Since the reinforcing fibers in each segment are held together by the binder material, each segment behaves like a moderately-heavy lump of material, and can be blended effectively into the bitumen-aggregate mixture so that individual filaments become oriented in essentially random three-dimensional directions between aggregate particles. In contrast, if an equivalent quantity of untreated fibers were introduced at the same point, the fibers would be much more likely to escape as airborne lint, to foul closing or mixing equipment, or to stick together in an all-fiber clump, with few filaments extending between, around or among aggregate particles. Thus, the binder treatment according to an embodiment improves material-handling options. It is appreciated that aramid fibers are strong, tough and limber, and difficult to cut. The binder provides benefits in that respect as well: embedding the fibers in the binder stiffens them and makes them easier to chop cleanly into segments of well-controlled length. Thus, closing systems that cut segments from a bulk length of treated fiber just before introduction into the mix may also be used in some manufacturing processes.

During mixing, the binder material that initially holds the fibers together is stripped off, melted out or otherwise distributed into the asphalt concrete mixture (160). Thus, to the extent that the binder ingredients are beneficial to the ACC mixture, the introduction of treated fibers into the mixture also delivers the binder ingredients.

Finally, the ACC mixture containing bitumen, aggregate, reinforcing fibers, binder ingredients, and possibly other materials, is spread on a surface (170) and compacted (180). Other surface- or bulk-treatment techniques may also be applied during construction (190). Or, for example, the AC mixture may be spread on a prepared geogrid or geotextile surface, which may provide other favorable characteristics to the finished pavement.

Reinforcing Fiber Selection

A variety of thin, monofilament or branched fibers are acceptable for use in an embodiment of the invention. For example, one may use polyethylene, polypropylene or nylon, provided that their temperature characteristics are compatible with the temperatures and conditions in the mixing environment. However, in view of the conditions under which embodiments are often used, aromatic polyamide fibers ("aramids") are preferred. Aramid fibers have good strength and excellent heat-resistance characteristics. The latter is especially useful because many ACC production processes include mixing at elevated temperatures, which may damage or destroy less-favored fiber materials.

Plain aramid fibers are acceptable, but one may also use fibers that have been treated to alter their surface structure or chemical activity, or coated with a material in a process generally referred to as "sizing." Fiber treatments and coatings may alter the fibers' physical shape (e.g., making straight fibers curly or kinky), or may create sites at which certain chemical bonds are easier to form. Treatments that affect individual fibers should not be confused with the binder treatment applied to bundles of individual fibers (i.e., yarns) to create treated bulk reinforcing fiber.

In some embodiments, mixtures of fibers may be used. For example, a yarn comprising both aramid fibers and glass fibers may be treated as described, or separate aramid and nylon fiber yarns may be treated independently, then combined into a multi-fiber rope before segmentation and mixing.

Binder Selection

The main function of a binder material in an embodiment of the invention is to hold a bundle of reinforcing fibers together tightly enough to prevent the individual fibers from escaping from the asphalt cement concrete mixture into the air (or elsewhere that they are not wanted), but not so tightly that the fibers remain clumped together in the finished ACC. A suitable binder is one that impedes friation of the reinforcing fibers in a severed segment until the segment is introduced into an ACC mixture, and that thereafter sheds fibers from the bundle under the heat and agitation or churning conditions of a mixing plant so that most or all of the filaments in the segment separate and are distributed between and among aggregate particles within the amount of time the mixture is being worked. Note that this time may be significantly shorter than the five to twenty minute mixing time of Portland cement concrete: an asphalt plant making tons of product per hour may only heat and mix ingredients for five to twenty seconds.

It is most convenient to think of the binder as a material similar to a wax, which can be melted and soaked into a fiber yarn, or which can be coated onto the outer surface of such a yarn by drawing the yarn across a solid block of wax. Wax compositions can be adjusted to provide accurate control of their softening profile and melting point. Embodiments of the invention can thus be targeted at specific asphalt production procedures: higher melting-point waxes for higher-temperature mixes help prevent the pre-treated reinforcing fiber segments from melting together into a large mass before being added to the mix; while lower melting-point waxes are suitable for cooler mixing temperatures to ensure that most or all of the treated fibers are released into the asphalt cement concrete during mixing.

A basic asphalt process mixes ingredients between about 130° C. and 165° C., but other ingredients and ingredient-preparations (e.g., replacing bitumen with a water-bitumen emulsion) can lower the mixing temperature significantly, saving energy and reducing emissions without overly degrading the ACC characteristics.

Some wax or wax-like materials impart beneficial characteristics to asphalt pavement, independently of their function in an embodiment to hold a bundle of reinforcing fibers together. A preferred binder material for an embodiment of the invention is a Fischer-Tropsch wax with a melting point around 95° C. (The wax softens and will shed embedded fibers under agitation at lower temperatures.) Suitable wax is commercially available from a number of suppliers, including Sasol Chemical Industries, Ltd. of South Africa, under the trade name Sasobit®. The wax is currently used in asphalt manufacture to improve the properties of bitumen (it increases the rut resistance of the resulting asphalt concrete).

Alternate Process

Although the preferred process is to treat a linear bundle of reinforcing fibers (e.g., a spool of yarn) with a binder and then to sever the treated bundle into segments of a suitable length, it is also possible to mix pre-cut fibers of uniform or random lengths into melted binder material. The binder is allowed to cool and solidify, and then it is cut or broken into chunks which can be added to asphalt concrete during mixing. The fibers in these chunks are oriented more-or-less randomly, unlike the mostly-parallel fibers in treated, severed yarns. Like the binder-treated yarn segments, these chunks shed reinforcing fibers and binder material into the asphalt during mixing.

Reinforcing Fiber Ratio Considerations

As discussed previously, embodiments of the invention produce significant asphalt performance increases with fairly small quantities (by weight or percentage) of treated reinforcing fibers. For example, adding one kilo of aramid fibers per metric ton of asphalt mix is an 0.1% ratio. (Note that the binder treatment may double or triple the weight of the bare fibers, so an actual mixture may introduce 2-3 kg of the inventive treated reinforcing fiber per ton of asphalt. Please also note that the actual weight of the inventive treated reinforcing fiber used per ton of asphalt may be either less or more than the example, due to the characteristics desired by the asphalt specifier.)

Introducing significantly larger quantities of treated reinforcing fiber may be economically infeasible (the aramid fiber is much more expensive than aggregate and bitumen), and the numerous, fine filaments provide a large total surface area onto which the bitumen can become coated. In effect, excessive fiber may soak up bitumen and interfere with adequate coating of the aggregate particles. Therefore, it is important not to assume that "some fibers are good, so more must be better." Adding more fibers may provide an additional beneficial reinforcing effect, but it may also require adjustment of other ingredient ratios to maintain the expected performance and characteristics of the resulting asphalt concrete. Such a mixture adjustment may increase the cost out of proportion with the improved performance realized.

The materials and processes of the present invention have been described largely by reference to specific examples and in terms of particular fibers and binders. However, those of skill in the art will recognize that reinforcing fibers can be introduced into and distributed throughout an asphalt cement concrete mixture by coating or embedding the fibers into a variety of binders, and cutting or dividing them in a variety of ways, without departing from the principles of the invention. Such variations and alternate methods are understood to be captured according to the following claims.

We claim:

1. A method of producing reinforced asphalt pavement, comprising:
   treating a plurality of roughly parallel reinforcing fibers with a binding agent to produce a treated reinforcing fiber bundle;
   severing the treated reinforcing fiber bundle to produce a plurality of treated reinforcing fiber bundle segments, the fibers of each segment being roughly parallel with each other and a length of each treated reinforcing fiber bundle segment between about 8 mm and about 100 mm;
   introducing the treated reinforcing fiber bundle segments into an asphalt cement concrete mixture;
   depositing the asphalt cement concrete mixture onto a surface; and
   compacting the asphalt cement concrete mixture to form a reinforced asphalt pavement.

2. The method of claim 1 wherein treating the plurality of reinforcing fibers comprises coating the plurality of reinforcing fibers with the binding agent.

3. The method of claim 1 wherein treating the plurality of reinforcing fibers comprises passing the plurality of reinforcing fibers through a melted binding agent and allowing the melted binding agent to solidify.

4. The method of claim 1 wherein treating the plurality of reinforcing fibers comprises embedding the plurality of reinforcing fibers in the binding agent.

5. The method of claim 1, further comprising:
   combining a plurality of treated reinforcing fiber bundles to create a treated reinforcing fiber rope.

6. The method of claim 1 wherein the severing operation creates treated reinforcing fiber bundle segments having a length of about 20 mm.

7. The method of claim 1 wherein a length of the treated reinforcing fiber bundle segments is controlled by feedback based on characteristics of previously-mixed asphalt cement concrete.

8. The method of claim 1 wherein the severing operation creates treated reinforcing fiber bundle segments having between about 250 reinforcing fibers and about 15,000 reinforcing fibers.

9. The method of claim 1, further comprising:
   churning the asphalt cement concrete mixture containing the treated reinforcing fiber bundle segments to distribute reinforcing fibers shed from the reinforcing fiber bundle segments throughout the asphalt cement concrete mixture.

10. The method of claim 1 wherein the reinforcing fibers are aramid fibers.

11. A method of producing reinforced asphalt cement concrete, comprising:
   treating a continuous length of multifilament aramid fiber yarn with a wax binder produce a continuous length of treated multifilament aramid fiber yarn;
   severing the continuous length of treated multifilament aramid fiber yarn to produce treated yarn segments of a roughly uniform length between about 8 mm and about 100 mm;
   metering the treated yarn segments into a warm asphalt cement concrete mixture during mixing thereof; and
   paving a surface with the asphalt cement concrete mixture.

12. A method of manufacturing improved asphalt cement concrete mix, comprising:
   treating an aramid fiber yarn longer than 100 mm with a wax binder;
   severing the treated aramid fiber yarn into a plurality of treated fiber segments of about 20 mm in length;
   heating and mixing aggregate particles with a viscous petroleum binder agent to create an asphalt cement concrete mixture; and
   introducing the treated fiber segments into the asphalt cement concrete mixture.

13. The method of claim 12 wherein the introducing operation occurs during the heating and mixing operation.

14. The method of claim 12 wherein the introducing operation comprises transporting treated fiber segments from a bulk store thereof into the asphalt concrete mixture via at least one of:
   a screw-auger conveyor system;
   a vibratory feeder system;
   a gravity feeding system;
   a positive-pressure pneumatic system; or
   a negative-pressure vacuum system.

* * * * *